(12) United States Patent
Stiesdal

(10) Patent No.: US 7,419,356 B2
(45) Date of Patent: Sep. 2, 2008

(54) METHOD FOR REGULATING A WINDMILL, AND AN APPARATUS FOR THE USE OF SAID METHOD

(75) Inventor: Henrik Stiesdal, Brande (DK)

(73) Assignee: Bonus Energy A/S, Brande (DK)

( * ) Notice: Subject to any disclaimer, the term of this patent is extended or adjusted under 35 U.S.C. 154(b) by 0 days.

(21) Appl. No.: 10/148,264

(22) PCT Filed: Sep. 28, 2001

(86) PCT No.: PCT/DK01/00622

§ 371 (c)(1),
(2), (4) Date: Jul. 22, 2002

(87) PCT Pub. No.: WO02/29247

PCT Pub. Date: Apr. 11, 2002

(65) Prior Publication Data

US 2003/0091436 A1     May 15, 2003

(30) Foreign Application Priority Data

Sep. 29, 2000    (DK) .............................. 2000 01450

(51) Int. Cl.
*F03D 7/02*     (2006.01)
(52) U.S. Cl. ............................................. 416/1; 416/23
(58) Field of Classification Search .................... 416/1, 416/23
See application file for complete search history.

(56) References Cited

U.S. PATENT DOCUMENTS 4,715,782 A * 12/1987 Shimmel ..................... 416/32

FOREIGN PATENT DOCUMENTS

| DE | 4446031 | 6/1996 |
|----|---------|--------|
| EP | 283730 | 9/1988 |
| EP | 394882 | 10/1990 |
| WO | WO 0075508 | 12/2000 |

* cited by examiner

*Primary Examiner*—Edward K. Look
*Assistant Examiner*—Kimya N McCoy
(74) *Attorney, Agent, or Firm*—James Creighton Wray; Clifford D. Hyra

(57) ABSTRACT

The invention relates to a method and a device for regulating the airflow around a blade of a windmill. The device comprise a spoiler, which is provided with a cavity. The spoiler is mounted to a surface of the blade in connection with an another flow regulating unit, and the spoiler can change the airflow around the blade by assuming different forms. When the spoiler is in a deactivated form no particular changes of the airflow takes place, as the spoiler runs continually and follows the contour of the blade. When the spoiler is in an activated form the airflow, however, is changed in that the spoiler no longer follows the contours of the blade and creates a discontinuity or at least changes the profile of the blade in such way that the airflow conditions are changed. In particular the airflow conditions can be changed so the effect of the second flow regulating unit completely or partly is eliminated. The change of the form takes place by supplying a fluid, such as compressed air or hydraulic oil, to the cavity in the spoiler. The change of the airflow is an advantage in that is thus is possible to regulate the speed of rotation of the rotor, which the blade is mounted on.

16 Claims, 8 Drawing Sheets

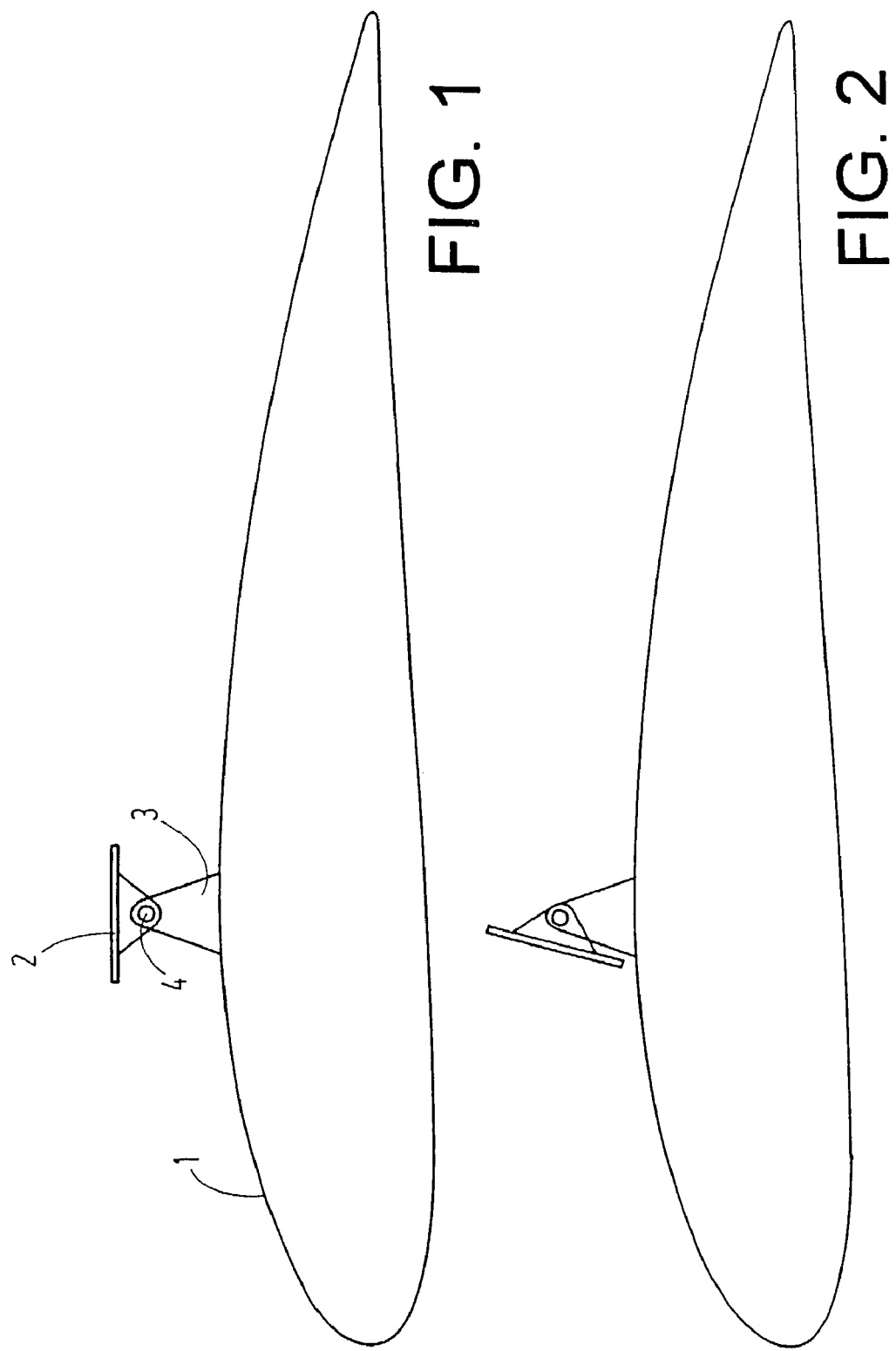

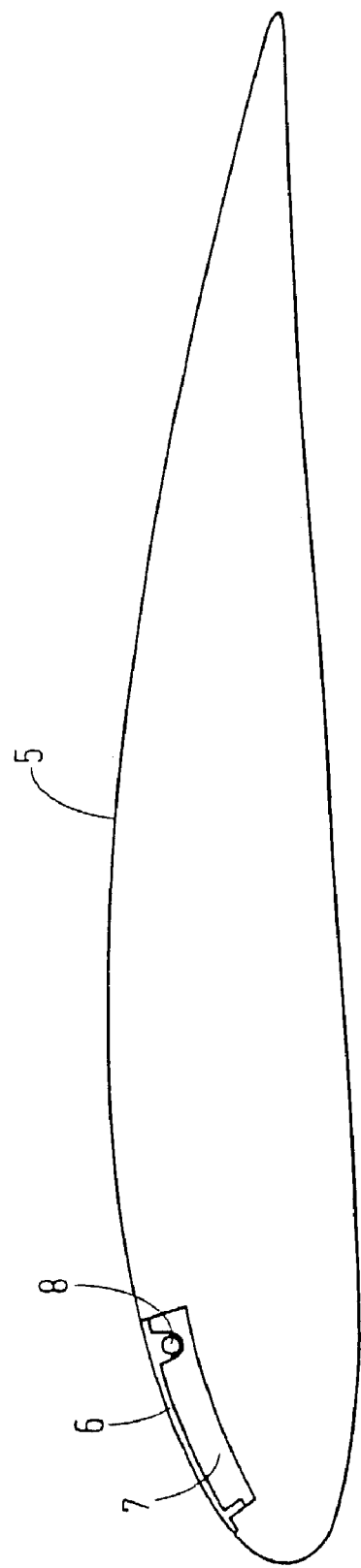
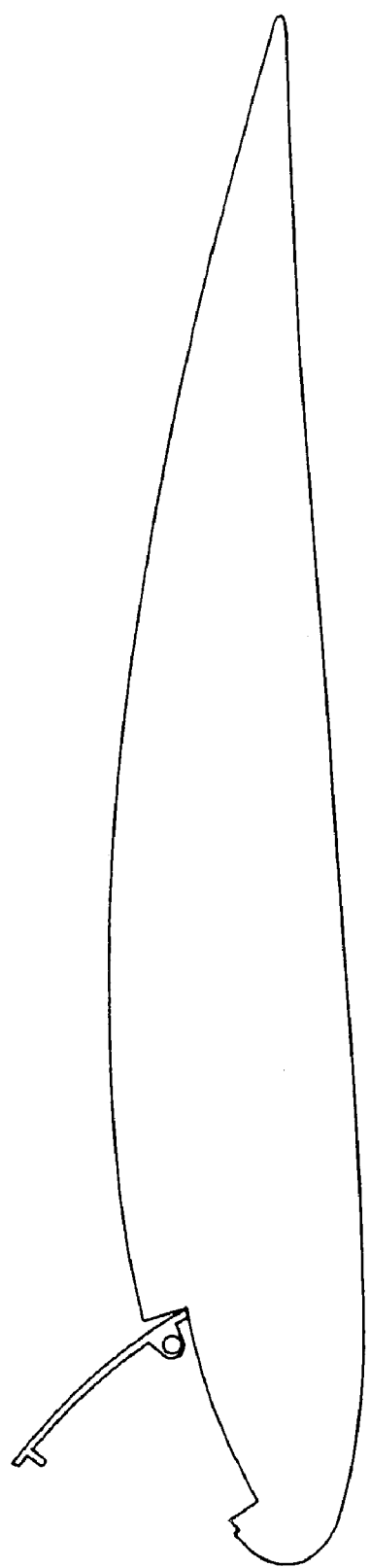
FIG. 3
FIG. 4

METHOD FOR REGULATING A WINDMILL, AND AN APPARATUS FOR THE USE OF SAID METHOD

BACKGROUND OF THE INVENTION

The invention relates to a method for regulating the airflow around a windmill blade, said method comprising a step, whereby a spoiler, mounted on the outer side of the blade, is activated and deactivated in order to create a first and respectively second airflow around the blade.

The invention also relates to a device for use when regulating the airflow around a windmill blade, where said device comprises at least one spoiler, which is made from a flexible material, provided with at least one cavity, and where the cavity in a deactivated form has a first volume and in an activated form has a second volume, and where the volume of the cavity can be changed from the deactivated form to the activated form by leading a fluid to the cavity.

It is known that one has to limit the power output of every mill in high wind, otherwise the mill can be overloaded. The normal methods for limiting the power output are stall regulation and pitch regulation.

With ordinary stall regulation, the blades are fixed on the hub of the mill and can not be turned around their longitudinal axis. The adjusting angle the blades have on the hub is adjusted once and for all during the mounting and commissioning of the mill. The blades are designed so the airflow over them in itself provides a greater air resistance in high wind and thereby limits the power output. Because of this passive use of the aerodynamic characteristics of the blades the regulation is simple and robust under all conditions, with only few peak loads.

Ordinary stall regulation has the disadvantage that the maximum power output depends on the air density and the surface roughness of the blade. There will, therefore, be changes in the power output from summer to winter, and when the blades are dirty. The stall effect also depends highly on the design of the front edge of the blade. Small manufacturing tolerances in the form of the front edges can cause considerable differences in the power output level that a windmill stall regulates at.

With pitch regulation the blades are mounted on bearings on the hub of the mill, so they can be turned around their longitudinal axis. In high wind the adjusting angle is always adjusted away from stall, so the lift is limited to provide the exact desired power output. With the active regulation it is possible to compensate for air density, surface roughness of the blade and influence from manufacturing tolerances.

Pitch regulation has the disadvantage that it demands a relatively complicated, active regulation, which in high wind can be sensitive to turbulence. Therefore, pitch regulation in practice presupposes a special generator with a completely or partly variable number of rotation, so the mill can speed up a bit up in case of wind gusts. Otherwise the active regulation cannot keep up with the variations in the wind, which results in too large peak loads. Pitch regulation also has the disadvantage compared to stall regulation with fixed adjusted blades in that the blades must be mounted rotably on the hub of the mill and, therefore, have to be provided with bearings and actuator systems. These components must be able to transfer great loads, and involve increased service needs.

A newer regulation form is active stall regulation. Here the two normal methods for limiting the power output are combined. Like with pitch regulation there are bearings between the blades and the hub of the mill, so that the entrance angle is adjustable, but the actual limiting of the power output in high wind is effected through stall.

Compared with ordinary stall regulation active stall regulation has the advantage that the maximum power output with certainty can be maintained at the desired level, regardless of air density, possible dirt on the blades and the influence from manufacturing tolerances. Compared with pitch regulation active stall regulation has the advantage that the actual regulation is effected with the use of stall, consequently through a passive use of the aerodynamic characteristics of the blade, so the sensibility to turbulence remains small. It is, therefore, not necessary to use special generators, variable rpm or the like in order to avoid high peak loads.

Nevertheless, active stall regulation has its own disadvantages compared to passive stall regulation with fixed adjusted blades. Like with pitch regulation there is the disadvantage that the blades have to be mounted rotably on the hub of the mill and, therefore, have to be supplied with bearings and actuator systems. These components have to transfer great loads, and involve increased service needs. With active stall regulation the regulation is slower than with pitch regulation, and the demands on the actuator systems are, therefore, smaller, but the complexity is, however, considerably larger than with passive stall regulation.

Apart from the regulation systems based on the turning of whole blades, spoilers on fixed adjusted blades are also known, where the regulation takes places through the spoiler effect, normally completely or partly supported by stalling of the blade. The spoiler can typically be designed as a rail, arranged over the suction side of the blade, and which by extension provides increased air resistance and turbulence, and maybe also trips an actual stall. Such spoilers were used on the windmills erected by FL. Smith in Denmark during the Second World War.

Spoiler systems of this kind normally have the disadvantages that they include mechanical parts far out on the blade. According to experience, is it difficult to maintain a high disposal level on such systems since the operating conditions are very difficult, and since the actuator mechanisms for the spoiler normally are badly suited to withstand the hundreds of millions of exposures that the system is subjected to during normal operation. In addition to this spoilers arranged over the blade surface, also when not activated, normally exhibit a certain constant spoiler effect, which reduces the aerodynamic efficiency of the blade. The external mounting can also result in a significant contribution to the noise.

There are other spoiler systems, which consist of rails or bellows deposited in the blade surface. The effect again depends on increased air resistance and turbulence, but in comparison to external spoilers the mechanism is somewhat better protected. Such spoilers are, among others, used in the early windmills of the WindMatic type in Denmark By being deposited in the blade surface this type of spoilers has the advantage that they not in any noticeable way reduce the aerodynamic efficiency of the blade, when they not are extended.

Deposited spoilers normally have the disadvantage that they demand special blade structures with recesses and cavities. Furthermore, they can normally only with difficulty be carried out at the actual front edge, where the air forces are powerful, but must be arranged further back on the suction side of the profile. Here the operating conditions are better, but the effect of the spoiler is in return more limited and, therefore, the spoiler has too be substantially larger. Noise problems may arise at the separating surfaces between the main blade and the spoiler, and the effect can be uncertain during icing and heavy pollution with dust etc., where extending and depositing can be restricted.

From European patent application EP 0 394 882 A1 a spoiler type is known, which consists of a flexible membrane arranged radially along a windmill blade approximately at the middle of the suction side of the blade, and which by inflating triggers stall on those sections of the blade, which are provided with this spoiler. Spoiler systems of this kind has the disadvantage that the effect of a stall triggered at the middle of the suction side normally will not be sufficient to provide a substantial regulation. In addition there is the disadvantage that this spoiler type presupposes a recessed channel on the blade in an area, where an unbroken and continued structure is needed for strength reasons.

From European patent application EP 0 283 730 A1 a flow body is known, where at least the one side is covered with a membrane, which can change form as a function of a inner pressure media Through inflation this body can assumably change its aerodynamic characteristics to such a high degree that a certain regulation can take place. A membrane system of this kind has the disadvantage that it covers large parts of the blade surface, and that the effect of the regulation can be difficult to control because of the large surfaces.

It is known that the air flow over a windmill blade can be regulated with flow regulating means. Examples of such means are for example described in the Danish utility model application DK 95 00238 W. Here, among other things, vortex generators are illustrated (FIG. 5).

SUMMARY OF THE INVENTION

The purpose with the present invention is to provide a method and a device for regulating the power output of a windmill with fixed adjusted blades, which reduces the disadvantages which are connected with the known methods.

This purpose is achieved by using a method of the aforementioned type, which is peculiar in that said first airflow is used to suppress a flow regulation, which is established by a flow regulating unit, which is arranged in connection with the spoiler and in that said flow regulation eliminates a unintended spoiler effect of said spoiler in its deactivated state.

The device according to the invention is characterised in that said at least one spoiler is mounted on a surface of the blade, and that a flow regulating unit is provided associated with said at least one spoiler.

The invention is thus based on a flexible spoiler, which is arranged on the suction side of the blade built together with or arranged associated with another type of flow regulating unit, and which is activated by filling it with a liquid or a gaseous medium.

This method is, surprisingly, very effective, and has a lot of advantages compared to the known systems.

By being based on an active regulation the disadvantages normally connected with passive stall regulation with fixed adjusted blades are avoided. With the active regulation it is possible to compensate for air density, surface roughness of the blade and the influence from manufacturing tolerances.

By being based on a spoiler effect the disadvantages normally connected with turning blade systems are avoided. Compared to the substantial costs for blade bearings and actuator systems, which must be able to transfer large loads, the cost of the spoiler system is completely marginal, likewise the service needs are heavily reduced.

By being based on a flexible spoiler type, mounted on the surface of the blade, the disadvantages normally connected with spoilers of the known type are avoided.

There is no loss of aerodynamic efficiency, when the spoiler is not extended, and by forming of the edges appropriately, so the height of the passage to the surface of the blade is small in comparison with the boundary layer, the risk of noise problem can be minimised. By being mounted on the surface of the blade the spoiler can avoid those recesses and cavities, which normally are connected with deposited spoilers. By not having separating surfaces between the spoiler and the main blade, the function of the spoiler also remains reliable under icing and heavy pollution with dust etc.

A particular advantage of the invention originates from the mounting on the surface of the blade. This has the effect that the spoiler can be retrofitted, so that the method for regulation can be introduced to existing windmills. Normally, this is not possible with the known spoiler types, maybe excepting the original type, which is mounted a bit above the surface of the blade.

By virtue of the fact that the spoiler is built together with or arranged in connection to another type flow regulating unit, a particularly favourable result of the interaction between the spoiler and the flow regulating unit can be obtained.

This particularly favourable interaction will occur, where the flow regulating unit in itself is of the type, which completely or partly delays the aerodynamic stall of the blade profile, for example embodied as vortex generators. The interaction can then be expressed in two ways.

Firstly a possibly smaller, unwanted spoiler effect of the spoiler in its non-active state will be eliminated when the spoiler is arranged in connection to the flow regulating unit, as long as this has sufficient capacity to override a such undesired and unfortunate spoiler effect in non-active state.

Secondly the spoiler and the flow regulating unit can be dimensioned mutually in such a manner that the spoiler, when activated, completely or partly eliminates the effect of the flow regulating unit If the flow regulating unit has a considerable influence on the aerodynamic characteristics of the blade, a large regulating effect can be achieved with the spoiler.

According to a particular embodiment the method is characterised in that the flow regulation provides the aerodynamic profile with a higher lift coefficient or otherwise leads to the fact that stall first occurs at a higher wind velocity. Hereby the maximum power output of the windmill will increase compared to what would have been the case if the second flow regulating unit was not mounted on the outer side of the blade.

The method is, according to further embodiments, characterised in that the spoiler's change in the airflow around the blade changes the flow regulation established by a vortex generator and that the change in the flow of air around the blade is regulated, so that the power output from the windmill is maintained at a certain level in high wind.

The device according the invention can be made in different ways, so that:
  the spoiler consist of a foil with a outer side, which is determined to face outwards in relation to the surface of the blade, and a inner side, which is determined to face inwards in relation to the surface of the blade, that said inner side of the foil is determined to be fastened to the surface of the blade, and that the cavity is formed between the outer side and the inner side of the foil;
  the foil has a centre area, where the cavity is formed, which has a thickness T, that said centre area converges against the edge areas, which have a thickness t, and that said thickness t is smaller than the thickness T;
  the centre area of the spoiler, when the spoiler assumes its deactivated form, has a outer side which converges continuously towards the edge areas, and that the centre area of the spoiler, when the spoiler assumes its activated form, at least provides a changed profile for the blade, preferably showing a discontinuity in relation to the surface of the blade;

through the cavity between the outer side of the spoiler and the inner side of the spoiler reinforcing ribs are formed, which are able to maintain a given minimum distance between the outer side and the inner side of the spoiler, when the device is in its deactivated form;

through the cavity there are formed passageways, which extend in narrower channels in the cavity, and which run between wider channels in the cavity, that the passageways are folded together, when the spoiler assumes its deactivated form, and said passageways are enlarged, when the spoiler assumes its activated form;

the spoiler is brought from its deactivated form to its activated form by filling the cavity with a given volume of fluid, preferably compressed air or another pressurised gas, alternatively hydraulic oil or another fluid;

the spoiler is brought from its activated form back to its deactivated form by emptying the cavity of fluid with aid from the airflow, which acts on the surface of the blade and on the outer side of the foil, and/or with aid from the centrifugal force acting on the fluid;

the spoiler is disposed on the suction side of the blade on only a part of the blade;

the spoiler is disposed in radial positions from innermost 0-30% to outermost 30-80% of the blade length;

the spoiler is placed immediately in front of a series of vortex generators with a height in the area of 3-50 mm; or the spoiler is manufactured from rubber, alternatively manufactured from plastic, and mainly is manufactured from an extruded profile of silicone rubber and with a width of 50-250 mm

BRIEF DESCRIPTION OF THE DRAWING

FIG. 1 shows a windmill blade with an external spoiler.

FIG. 2 shows the spoiler of FIG. 1 in activated position.

FIG. 3 shows a windmill blade with a built-in spoiler.

FIG. 4 shows the spoiler of FIG. 3 in an activated position.

DETAILED DESCRIPTION OF THE PREFERRED EMBODIMENTS

Figure 5:
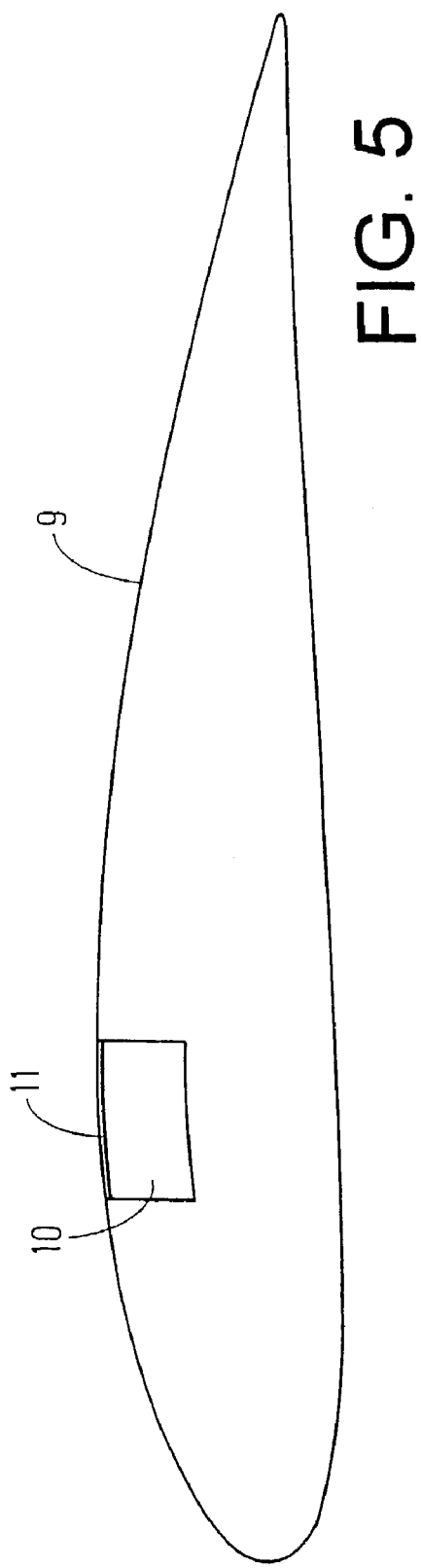
FIG. 5 shows a windmill blade with a built-in flexible spoiler.

In the following the invention is described in more detail with reference to the figures.

FIG. 1 shows a windmill blade with an external spoiler of known, older type. The blade profile 1 is provided with spoiler rail 2, which is carried by a series fittings 3 with hinges 4. The spoiler is shown in its normal deactivated position, where no spoiler effect is desired.

FIG. 2 shows the same spoiler in an activated position, where the spoiler is turned to maximum effect by mechanical means.

FIG. 3 shows a windmill blade with a built-in spoiler of known, newer type. The blade profile 5 is provided with a spoiler rail 6, which is deposited in a cavity 7 in the blade surface, and which can turn about a hinge 8. The spoiler is shown in its normal deactivated position, where no spoiler effect is desired.

FIG. 4 shows the same spoiler in an activated position, where the spoiler is turned to maximum effect by mechanical means.

FIG. 5 shows a windmill blade with a built-in flexible spoiler of known, newer type. The blade profile 9 is provided with a cavity 10, which is covered with a flexible membrane 11. The cavity 10 extends along a part of the blade length, and is closed inwards against the base of the blade and outwards against the tip of the blade with valves, which are not shown on the figure. The spoiler is shown in its normal, deactivated position, where no spoiler effect is desired.

Figure 6:
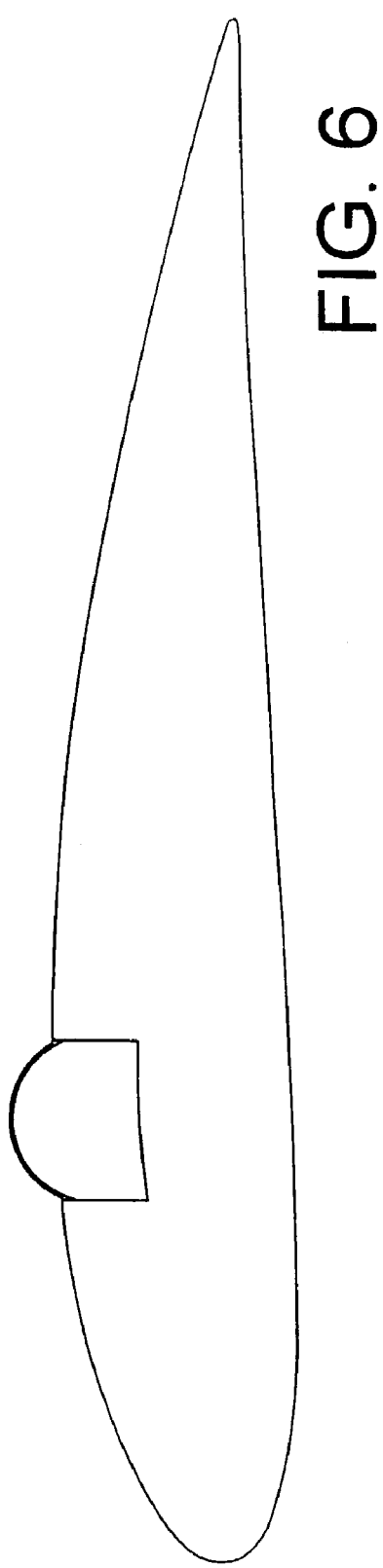
FIG. 6 shows the spoiler of FIG. 5 in its activated position

FIG. 6 shows the same spoiler in its activated position, where the spoiler membrane is inflated to maximum effect. The activation takes place by opening the innermost valve and closing the outermost. The inflation is then caused by the overpressure, which originates from the centrifugal force on the air column, which stands in the blade cavity. Deactivation takes place by closing the innermost valve and open the outermost.

Figure 7:
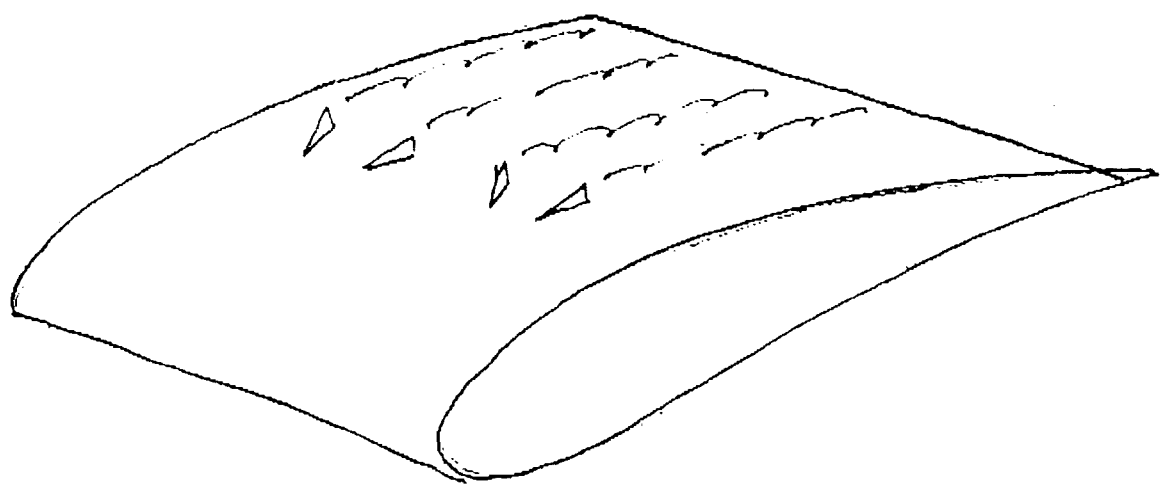
FIG. 7 shows a flow regulating unit.

FIG. 7 shows a flow regulating unit in the form of vortex generators mounted on the suction side of a windmill blade. By producing whirls, which pump energy into the boundary layer, the vortex generators delay the occurrence of stall.

Figure 8:
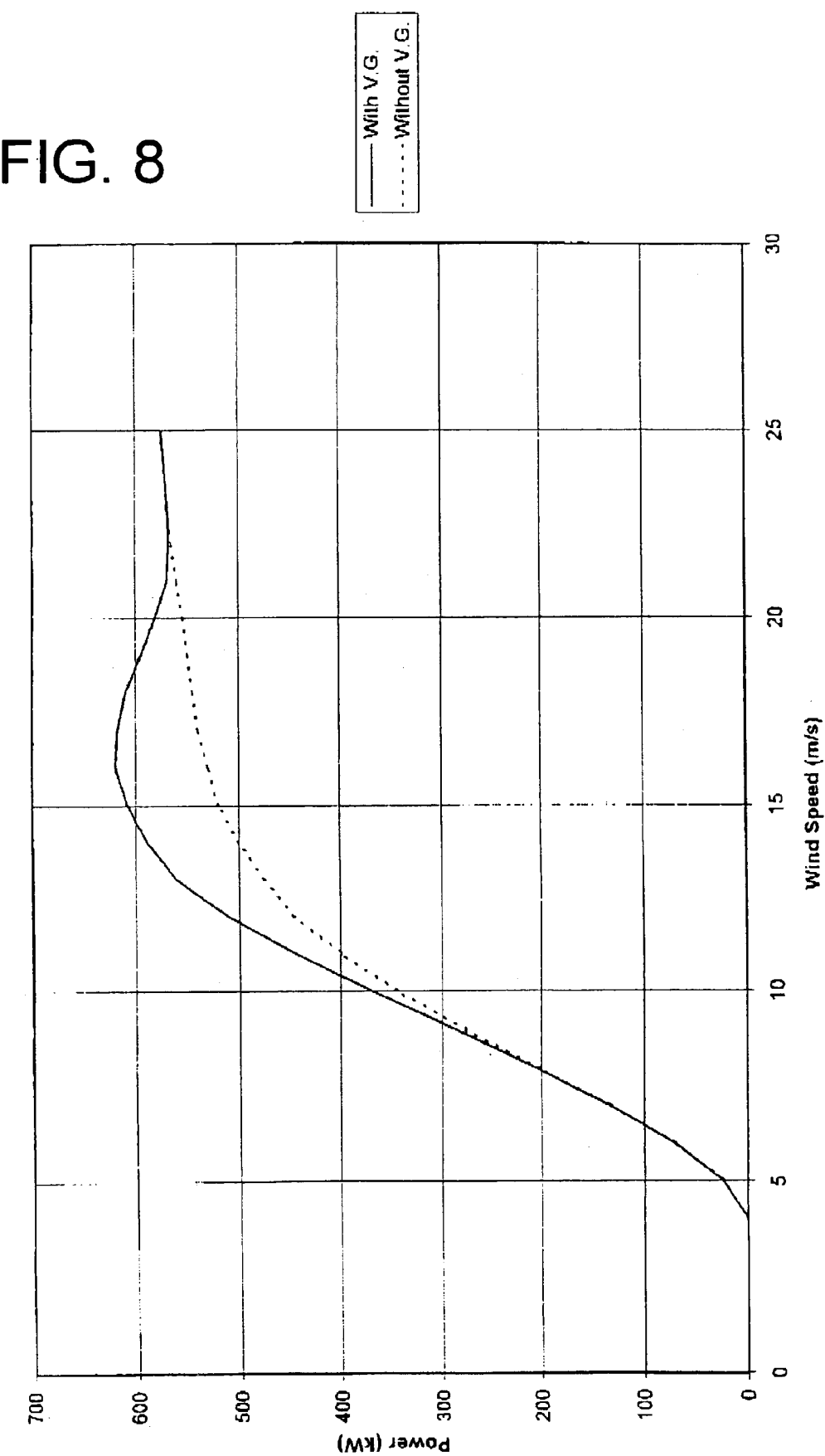
FIG. 8 shows a passive stall regulated windmill power output curve.

FIG. 8 shows a passive stall regulated windmill power output curve with and without vortex generators. It is shown how the wind speed at which the regulation really limits the increase in power output, increases with vortex generators, and how the maximum power output increases correspondingly.

Figure 9:
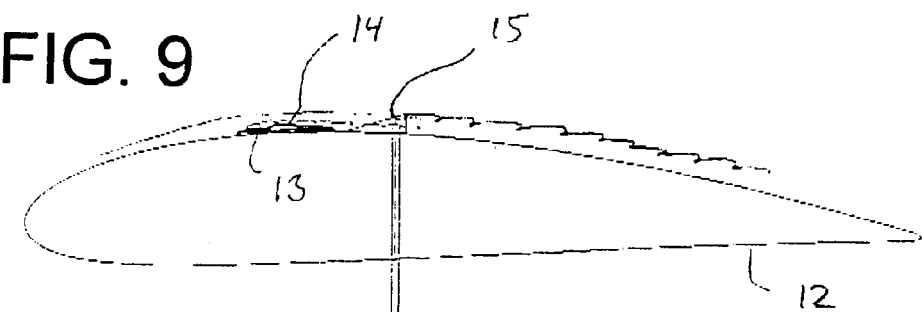
FIG. 9 shows a windmill blade with a spoiler.

FIG. 9 shows a windmill blade with a spoiler according the invention. The blade profile 12 is provided with a flexible spoiler 13, which extends along a part of the blade length. The spoiler has a cross section with a cavity 14. The cavity 14 is partly closed outwards against the tip of blade, and is connected inwards against the base of the blade to a compressed air system, which can apply a larger or smaller pressure on the spoiler cavity. The spoiler is shown in its normal deactivated position, where no spoiler effect is desired. Associated with the spoiler a flow regulating unit 15 is arranged, here embodied as vortex generators. The flow regulating unit is here arranged between the spoiler and the back edge of the blade, but can also be arranged between the spoiler and the front edge of the blade. It is shown how a small whirl from the front edge of the spoiler is completely suppressed by the much larger whirls from the vortex generators.

Figure 10:
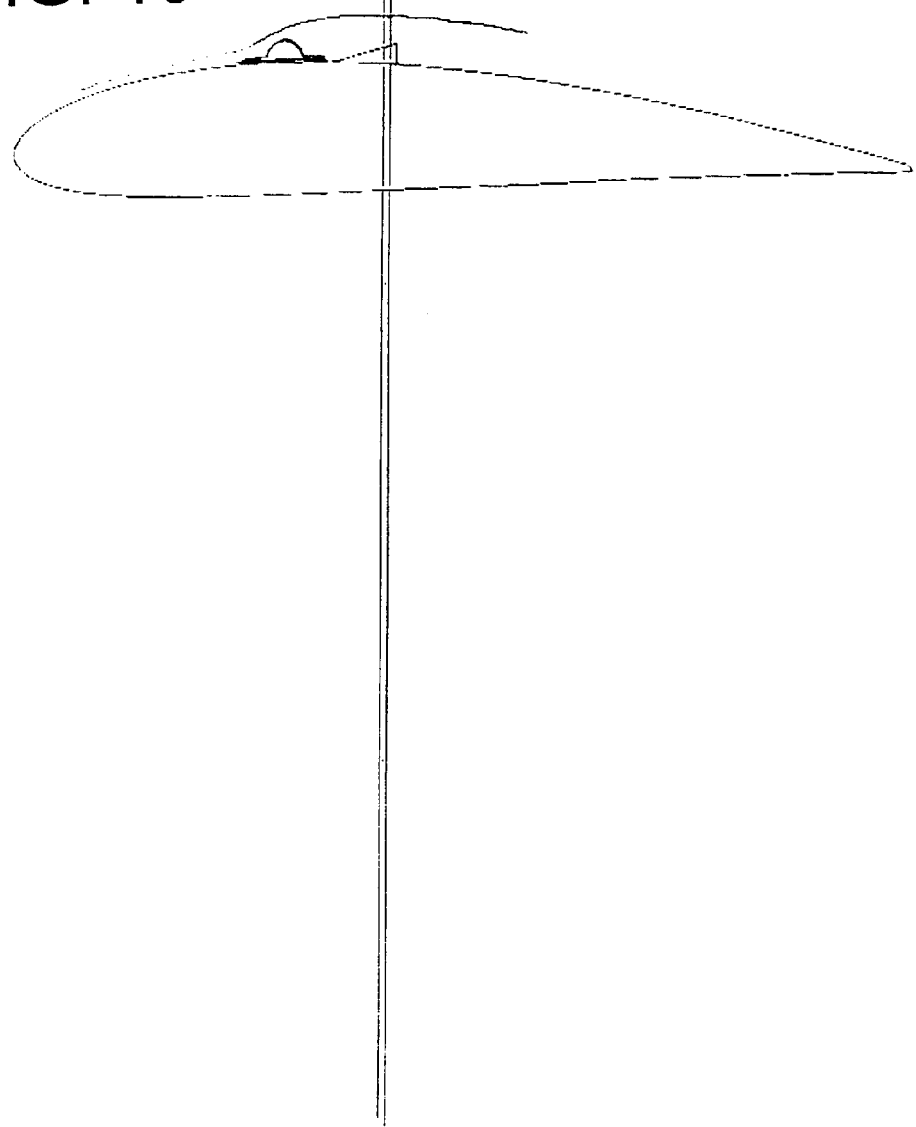
FIG. 10 shows the spoiler of FIG. 9 in its activated position.

FIG. 10 shows same spoiler in its activated position, where the spoiler is blown up to the maximum effect. The activating normally occurs by applying pressure to the cavity of the spoiler. The spoiler can be inflated without steps, depending on the applied pressure. The deactivating occurs by reducing filling pressure. Emptying is reinforced by the centrifugal effect on the air column standing in the spoiler cavity, possibly supplied with the ejector effect from passing airflow at the outermost end of the spoiler. Here, the spoiler is activated to such a high degree that the airflow deflects around the flow regulating unit, which then becomes ineffective. All intermediate stages of activation are possible, so the effect of the flow regulating unit can be influenced to a larger or smaller degree.

Figure 11:
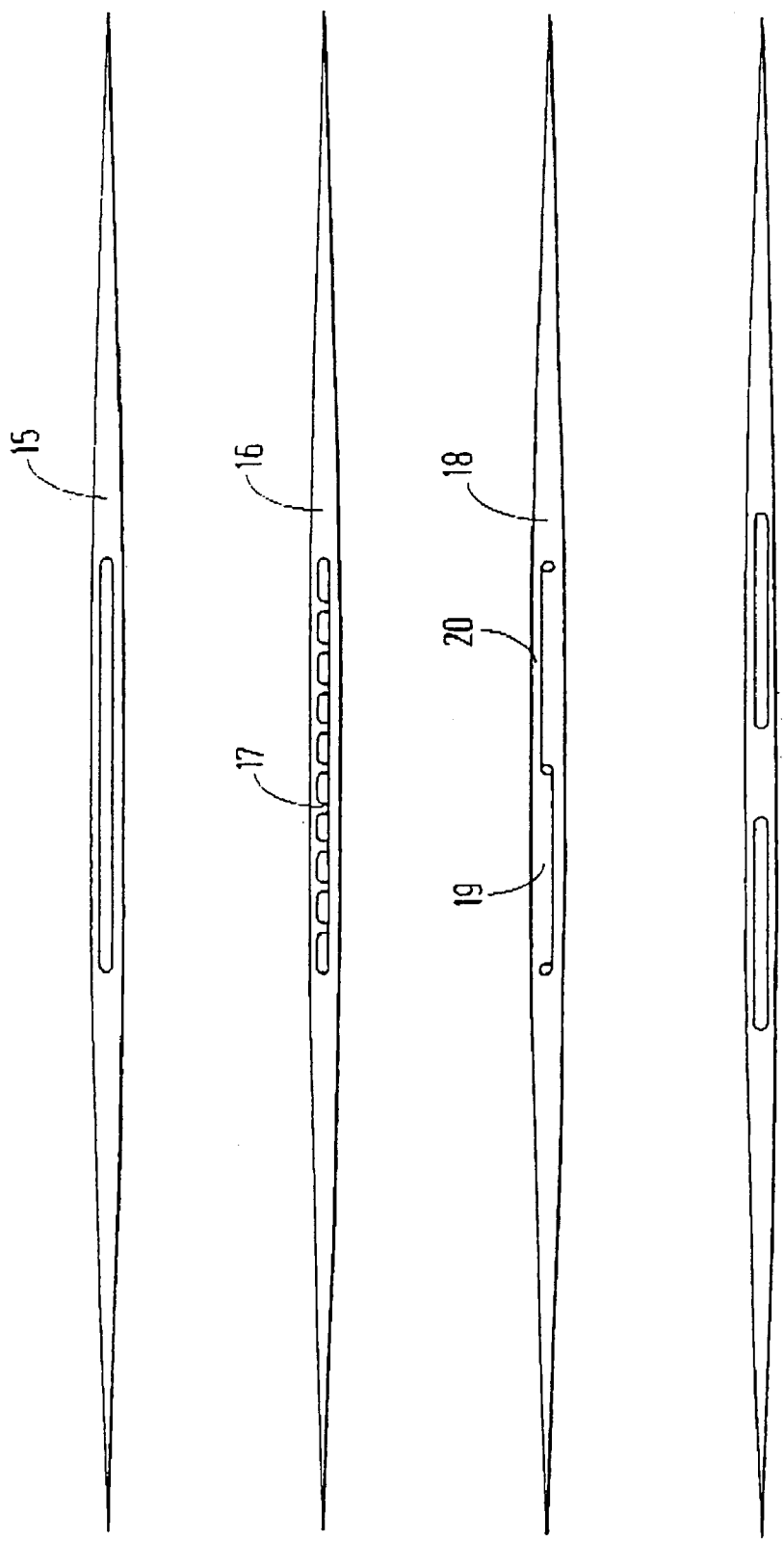
FIG. 11 shows examples of cross sections of spoilers.

FIG. 11 shows examples of cross sections of spoilers according the invention, before the spoilers are mounted on the blade. The spoilers can for example be extruded in silicone rubber or in EPDM Shore 45, whereby they easily can be mounted on suction sides with different curvatures. A normal preferred embodiment 16 may include a number of ribs 17, which maintain the form of the cavity during an possible under-pressure from the suction effect under the centrifugal effect, but which, however provides a good access for air to inflation. A third preferred embodiment 18 can exhibit an uneven cross section of the cavity, where one part 19 has a large material thickness of the side, which expands when inflated, while another part 20 has a lesser material thickness. Hereby can the form of the inflated spoiler be adjusted to provide the most advantageous replacement of the air flow. In a fourth preferred embodiment the cavity can be divided in two or more parallel channels, which may be inflated to different pressures. Thus, the form differentiates further, and a larger part of the spoiler can be imparted a form, which is favourable for the replacing.

Figure 12:
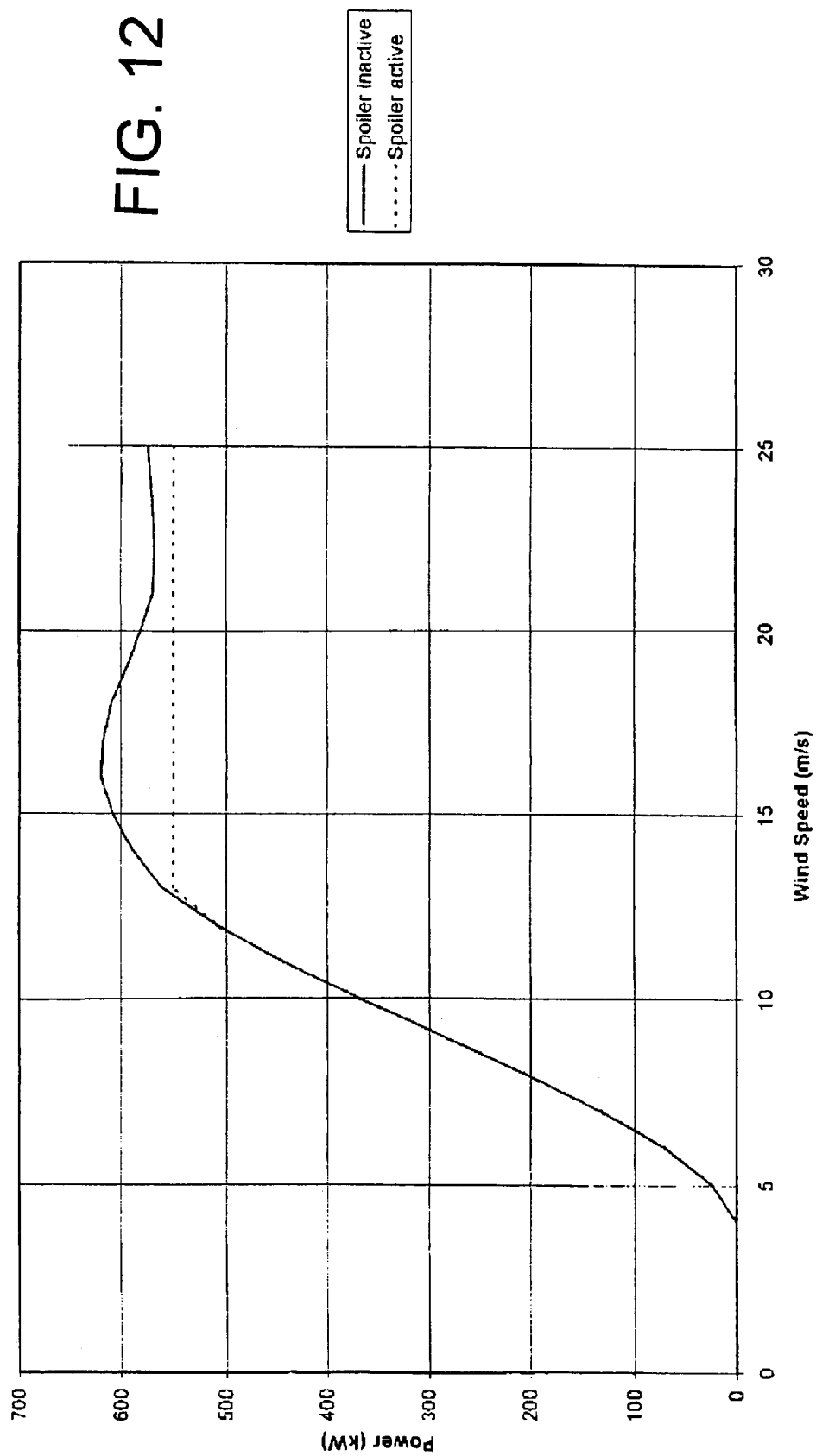
FIG. 12 shows an example of a power output curve for a mill.

FIG. 12 shows an example of a power output curve for a mill provided with a spoiler according the invention. The two graphs shows the power output curve respectively with and without active spoiler regulation.

The invention claimed is:

1. Method for regulating the airflow around a windmill blade, said method comprising a step, whereby a spoiler, mounted on the outer side of the blade, is activated and deactivated in order to create a first and respectively second airflow around the blade, characterised in that said first airflow is used to suppress a flow regulation, which is established by a flow regulating unit, which is arranged in connection with the spoiler and in that said flow regulation eliminates an unintended spoiler effect of said spoiler in its deactivated state.

2. Method according to claim 1, characterised in that the flow regulation provides the aerodynamic profile with a higher lift coefficient or otherwise delays stall to first take place with a higher wind velocity.

3. Method according to claim 1 or claim 2, characterised in that the spoilers change of airflow around the blade changes the flow regulation established by a vortex generator.

4. Method according to any of the claims 1-3, characterised in that the change of airflow around the blade is regulated so that the power output from the windmill is maintained at a certain level in high wind.

5. Device for use when regulating the airflow around a windmill blade, where said device comprises at least one spoiler, which is made from a flexible material, provided with a least one cavity, and where the cavity in a deactivated form has a first volume and in an activated form has a second volume, and where the volume of the cavity can be changed from the deactivated form to the activated form by leading a fluid to the cavity, characterised in that said at least one spoiler is mounted on a surface of the blade, and that a flow regulating unit is provided associated with said at least one spoiler.

6. Device according to claim 5, characterised in that the spoiler constitutes a foil with a outer side, which is determined to face outwards in relation to the surface of the blade, and a inner side, which is determined to face inwards in relation to the surface of the blade, that said inner side of the foil is determined to be fastened to the surface of the blade, and that the cavity is formed between the outer side and the inner side of the foil.

7. Device according to claim 5 or claim 6, characterised in that the foil has a centre area, where the cavity is formed, and which has a thickness T, that said centre area converges against the edge areas, which have a thickness t, and that said thickness t is less than the thickness T.

8. Device according to any of the claims 5-7, characterised in that the centre area of the spoiler, when the spoiler assumes its deactivated form, has a outer side which converges continuously towards the edge areas, and that the centre area of the spoiler, when the spoiler assumes its activated form, at least provides a changed profile for the blade, preferably showing a discontinuity in relation to the surface of the blade.

9. Device according to any of the claims 5-8, characterised in that through the cavity between the outer side of the spoiler and the inner side of the spoiler there are formed reinforcing ribs, which are able to maintain a given minimum distance between the outer side and the inner side of the spoiler, when the device is in its deactivated form.

10. Device according to any of the claims 5-9, characterised in that through the cavity there are formed passageways extending in narrower channels in the cavity, and which runs between wider channels in the cavity, that said passageways are folded together, when the spoiler assumes its deactivated form, and that said passageways are enlarged, when the spoiler assumes its activated form.

11. Device according to any of the claims 5-10, characterised in that the spoiler is brought from its deactivated form to its activated form by filling the cavity with a given volume of fluid, preferably compressed air or another pressurised gas, alternatively hydraulic oil or another fluid.

12. Device according to claims 11, characterised in that the spoiler is brought from its activated form back to its deactivated form by emptying the cavity of fluid with aid from the airflow, which acts on the surface of the blade and on the outer side of the foil, and/or with aid from the centrifugal force acting the fluid.

13. Device according to any of the claims 5-12, characterised in that the spoiler is placed on the suction side of the blade on only a part of the blade.

14. Device according to 13, characterised in that the spoiler is placed in radial positions from innermost 0-30% to outermost 30-80% of the blade length.

15. Device according to 14, characterised in that the spoiler is placed immediate in front of a series of vortex generators with a height in the area of 3-50 mm.

16. Device according to any of the claims 5-15, characterised in that the spoiler is manufactured from rubber, alternatively manufactured from plastic, and preferably is manufactured from an extruded profile of silicone rubber and with a width of 50-250 mm.

* * * * *